United States Patent
Ohtsuka et al.

(10) Patent No.: US 7,367,439 B2
(45) Date of Patent: May 6, 2008

(54) ELECTROMAGNETIC CLUTCH WITH ELASTIC MEMBER EASILY MELTED

(75) Inventors: Kazuhiko Ohtsuka, Toyohashi (JP);
Yasuo Tabuchi, Toyoake (JP);
Toshihiro Hayashi, Chiryu (JP)

(73) Assignee: Denso Corporation, Kariya (JP)

( * ) Notice: Subject to any disclaimer, the term of this patent is extended or adjusted under 35 U.S.C. 154(b) by 225 days.

(21) Appl. No.: 11/140,757

(22) Filed: May 31, 2005

(65) Prior Publication Data
US 2005/0269183 A1    Dec. 8, 2005

(30) Foreign Application Priority Data
Jun. 4, 2004    (JP) .............................. 2004-167123

(51) Int. Cl.
*F16D 27/112*    (2006.01)
(52) U.S. Cl. .............................. 192/84.941; 192/84.961
(58) Field of Classification Search ........... 192/84.941; 464/31
See application file for complete search history.

(56) References Cited

U.S. PATENT DOCUMENTS

| | | | |
|---|---|---|---|
| 4,445,606 A | | 5/1984 | Van Laningham |
| 5,036,964 A | * | 8/1991 | Booth et al. ............. 192/84.941 |
| 5,632,366 A | * | 5/1997 | Mullaney ................ 192/84.941 |
| 5,642,797 A | * | 7/1997 | Wall ....................... 192/84.961 |
| 5,642,798 A | * | 7/1997 | Muirhead et al. ...... 192/84.961 |
| 6,209,699 B1 | * | 4/2001 | Hayashi et al. ........ 192/84.941 |
| 7,090,063 B2 | * | 8/2006 | Imai et al. ............. 192/84.941 |
| 2004/0188217 A1 | | 9/2004 | Konishi et al. |

FOREIGN PATENT DOCUMENTS

| | | |
|---|---|---|
| DE | 199 42 662 | 3/2000 |
| EP | 0 239 401 | 9/1987 |
| FR | 2 853 029 | 10/2004 |
| JP | 53-39822 | 9/1978 |
| JP | 2000-161389 | 6/2000 |

OTHER PUBLICATIONS

French Search Report dated Nov. 23, 2006 in French Application No. 0505627.

* cited by examiner

*Primary Examiner*—Rodney H. Bonck
(74) *Attorney, Agent, or Firm*—Harness, Dickey & Pierce, PLC

(57) ABSTRACT

The electromagnetic clutch comprises a rotor connected to a drive source, an inner hub connected to a device that follows, an outer plate provided on the outside of the inner hub so as to enclose it, an armature coupled to the outer plate and opposing the rotor, an elastic member provided between the inner hub and the outer plate and adhered thereto, and an electromagnetic coil for, when magnetized, attracting the armature together with the outer plate to make them come into contact with the rotor, and when demagnetized, separating the outer plate and the armature from the rotor. Because of the configuration in which the armature and the outer plate are coupled in a heat-transmissible manner, a part of elastic member is formed so that heat is transmitted from at least a part of the armature to the part of the elastic member as if they are one piece.

14 Claims, 10 Drawing Sheets

ELECTROMAGNETIC CLUTCH WITH ELASTIC MEMBER EASILY MELTED

BACKGROUND OF THE INVENTION

1. Field of the Invention

The present invention relates to an electromagnetic clutch and, more particularly, to an electromagnetic clutch used for connecting and disconnecting a compressor of an air conditioner in a vehicle.

2. Description of the Related Art

In a vehicle, an engine, which is a drive source, is used not only as a drive source for moving a vehicle but also as a drive source for various devices. There are many vehicles in which the compressor of an air conditioner for a vehicle is driven by an engine via a belt etc. In this case, the load applied to the engine can be reduced and fuel consumption can be improved by separating the compressor from the engine when it is not necessary to drive the air conditioner for a vehicle. It is also preferable, from the standpoint of life of the compressor to stop the compressor when not required. Because of such a need, an electromagnetic clutch is arranged between an engine and a compressor of an air conditioner for a vehicle for connecting and disconnecting the compressor.

However, when the compressor locks or if trouble occurs in the compressor without driver's knowledge, the electromagnetic clutch slips and produces heat and there may arise the possibility that another trouble, such as the breakage of a belt, occurs. Therefore, when an electromagnetic clutch is installed, measures against such problems must be taken.

Some conventional electromagnetic clutches use a temperature fuse or a lock sensor as a function for protecting a belt when the compressor locks. However, a temperature fuse poses a problem that it takes time to shut off power transmission and a lock sensor poses a problem that the cost is raised.

Figure 10:
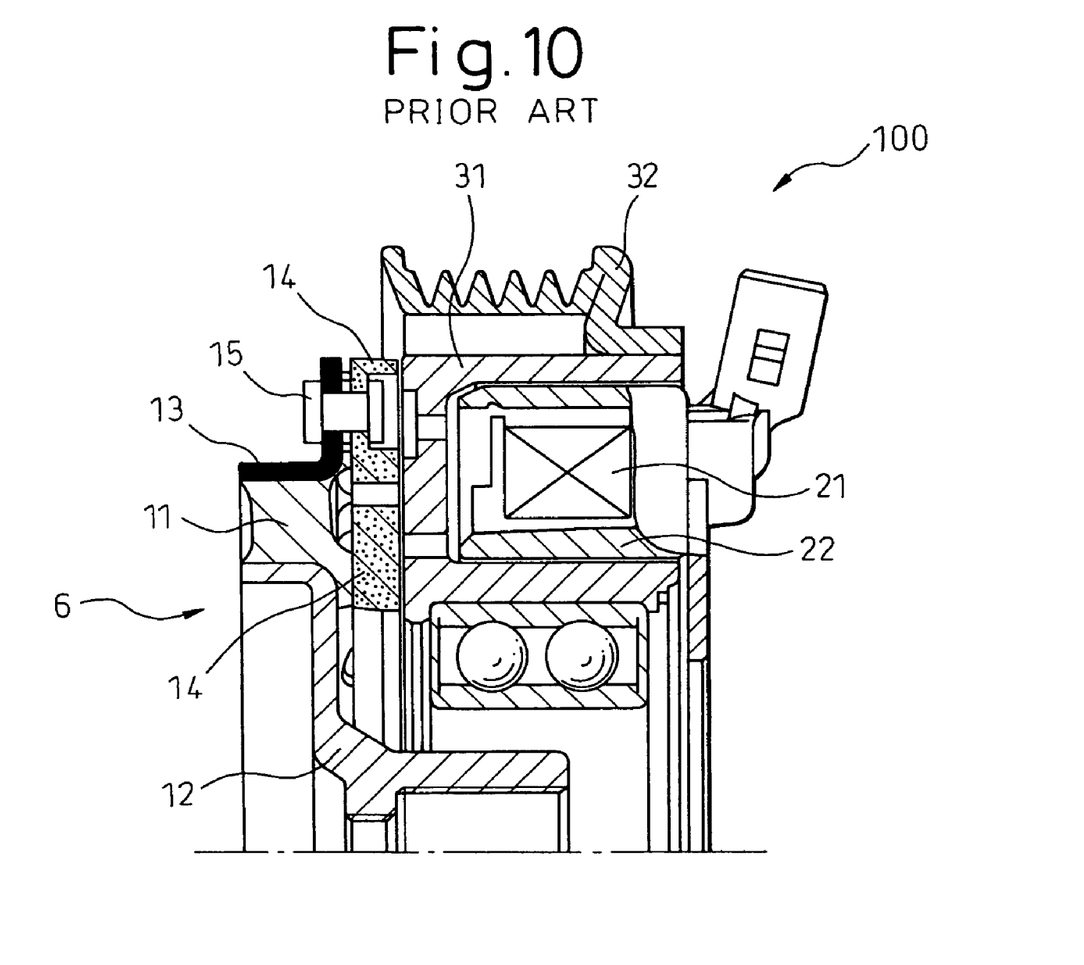
FIG. 10 shows one half of the sectional side elevation of a conventional example of a general electromagnetic clutch.

FIG. 10 shows one half of the sectional side elevation of a conventional example of a general electromagnetic clutch. In general, an electromagnetic clutch is substantially symmetrical in the vertical direction, therefore, only the upper half is shown. An electromagnetic clutch 100 in a conventional example shown in FIG. 10 comprises an electromagnetic coil 21 accommodated in a stator 22, a rotor 31 rotatively driven by a vehicle engine, which is not shown, an armature 14 that is attracted to the rotor 31 by the magnetic force of the electromagnetic coil 21, and a hub 6. The hub 6 has an outer plate 13 and an inner hub 12 and the outer plate 13 and the inner hub 12 are connected by welding a cylindrical rubber 11 thereto.

In the electromagnetic clutch 100 in the conventional example shown in FIG. 10, the outer plate 13 and the armature 14 are formed as separate parts and are attached by a plurality of rivets 15. Therefore, the armature 14 and the inner hub 12 rotate as one piece. The inner hub 12 is connected to the rotating shaft of the compressor of an air conditioner for a vehicle (not shown) and transmits the power of the engine to the compressor. The rotor 31 has a pulley 32 on its outer circumferential side. On one hand, a plurality of belts (not shown) are engaged with the pulley 32 and on the other hand, the belts are engaged with a pulley (not shown) on the engine side and, therefore, the drive force of the engine is transmitted to the pulley 32 and the rotor 31 via the belts. The operation of connecting and disconnecting the electromagnetic clutch 100 is performed by magnetizing the electromagnetic coil 21 to attract the armature 14 to the rotor 31 and by demagnetizing the electromagnetic coil 21 to separate the armature 14 from the rotor 31.

In the conventional example shown in FIG. 10, the outer plate 13 and the armature 14 are formed as separate parts and are attached with the rivets 15. In this structure, when the compressor locks, the heat produced at the frictional surface between the rotor 31 and the armature 14 is unlikely to be transmitted to the cylindrical rubber 11 and it takes time for the cylindrical rubber 11 to melt and shut off power and, therefore, there is the possibility that the belt is damaged.

For example, there is a prior art similar to the above-mentioned prior art, in which a cylindrical rubber damper is provided (for example, refer to Japanese Unexamined Utility Model 53-39822). In this art, as there is a gap between an armature and an outer plate, heat is unlikely to be transmitted and, therefore, it is difficult to shut off power transmission. Another art is proposed (for example, refer to Japanese Unexamined Patent Publication (Kokai) No. 2000-161389A). In this cited art, an elastic member is melted to shut off power transmission. However, there arises a problem that the damping effect is slight and the performance of absorbing torque variations is poor although the member is readily melted to shut off power transmission.

[Patent document] Japanese Unexamined Utility Model 53-39822

[Patent document] Japanese Unexamined Patent Publication (Kokai) No. 2000-161389A

SUMMARY OF THE INVENTION

The above-mentioned problems being taken into account, the object of the present invention is to provide an electromagnetic clutch having a safety device for preventing belts for transmitting power from being damaged by disconnecting the electromagnetic clutch so as to quickly separate a compressor of an air conditioner for a vehicle, for example, when the compressor locks.

In greater detail, the object of the present invention is to transmit frictional heat produced in the electromagnetic clutch to an elastic member to quickly melt the latter by integrally forming an outer plate and the armature and to stop power transmission between an armature and a hub when a compressor locks.

In order to attain the above-mentioned objects, an electromagnetic clutch according to a first aspect of the present invention comprises a rotor connected to a drive source, an inner hub connected to a device that is driven, an outer plate provided on an outside of the inner hub so as to enclose it, an armature coupled to the outer plate and opposing the rotor, an elastic member provided between the inner hub and the outer plate and adhered thereto, and an electromagnetic coil for, when magnetized by being applied with a current, attracting the armature together with the outer plate to make the armature and the outer plate directly come into contact with the rotor, and when demagnetized by terminating the application of current, separating the outer plate and the armature from the rotor.

With this configuration, it becomes possible to efficiently transmit heat produced at the frictional surface to the elastic member by utilizing the characteristics of the electromagnetic clutch, according to the prior art described in Japanese Unexamined Utility Model 53-39822, that the performance thereof for damping vibration is excellent and the performance of absorbing torque variations which reduces magnitude of torque variations is excellent and further by forming a structure in which the outer plate and the armature are integrally coupled to each other, thereby giving no gap therebetween. Due to this, as it becomes easy to melt the elastic member and shut off power transmission, a much safer electromagnetic clutch can be provided.

A second aspect according to the first aspect of the present invention is characterized in that the elastic member has an adhesion surface which is adhered to the outer plate, which surface is parallel to an electromagnetic clutch shaft line.

According to the present aspect, the adhesion surface of the elastic member to the outer plate is made more concrete.

A third aspect according to the first or second aspect of the present invention is characterized in that the elastic member is substantially cylindrical, an inner wall of the elastic member is adhered to an outer part of the inner hub, and an outer wall of the elastic member is adhered to an inner wall of the outer plate.

According to the present aspect, an aspect in which the configuration of the electromagnetic clutch is made more concrete is disclosed.

A fourth aspect according to any one of the first to third aspects of the present invention is characterized in that the elastic member is in contact with the armature.

According to the present aspect, as the transmission of the heat produced at the frictional surface to the elastic member becomes more efficient, it becomes easy to more quickly melt the elastic member and shut off power transmission.

A fifth aspect according to any one of the first to fourth aspects of the present invention is characterized in that the outer plate has an L-shaped sectional area and comes into surface-contact with the rotor.

According to the present aspect, the outer plate has a simple shape and it is easy to transmit heat from the armature to the elastic member via the outer plate.

A sixth aspect according to any one of the second to fourth aspects of the present invention is characterized in that the armature comprises two parts divided by a magnetic shut-off section and one part thereof is integrally formed with the elastic member having an adhesion surface to the outer plate, which surface is parallel to the electromagnetic clutch shaft line, and the one part is connected to the other part at a bridge part.

According to the present aspect, there is the possibility that the manufacture of the outer plate and the armature becomes easier while it is easy to melt the elastic member and shut off power transmission.

A seventh aspect according to any one of the first to sixth aspects of the present invention is characterized in that the part integrated into one piece in a heat-transmissible manner does not extend along the entire circumference.

According to the present aspect, an aspect in which there is the possibility that the configuration of the electromagnetic clutch is further simplified is disclosed.

An eighth aspect according to the sixth aspect of the present invention is characterized in that the method by which the armature having the two parts divided by the magnetic shut-off section and the outer plate are coupled with each other is press fitting or external cylinder drawing.

According to the present aspect, the method for coupling the outer plate and the armature is made more concrete.

A ninth aspect according to any one of the first to eighth aspects of the present invention is characterized by being used for connecting and disconnecting the refrigerant compressor of an air conditioner with a vehicle engine.

According to the present aspect, the use of the electromagnetic clutch is made more concrete.

The present invention may be more fully understood from the description of the preferred embodiments of the invention set forth below, together with the accompanying drawings.

DESCRIPTION OF THE PREFERRED EMBODIMENTS

The electromagnetic clutch in the embodiments of the present invention is explained in detail based on the drawings.

Figure 1:
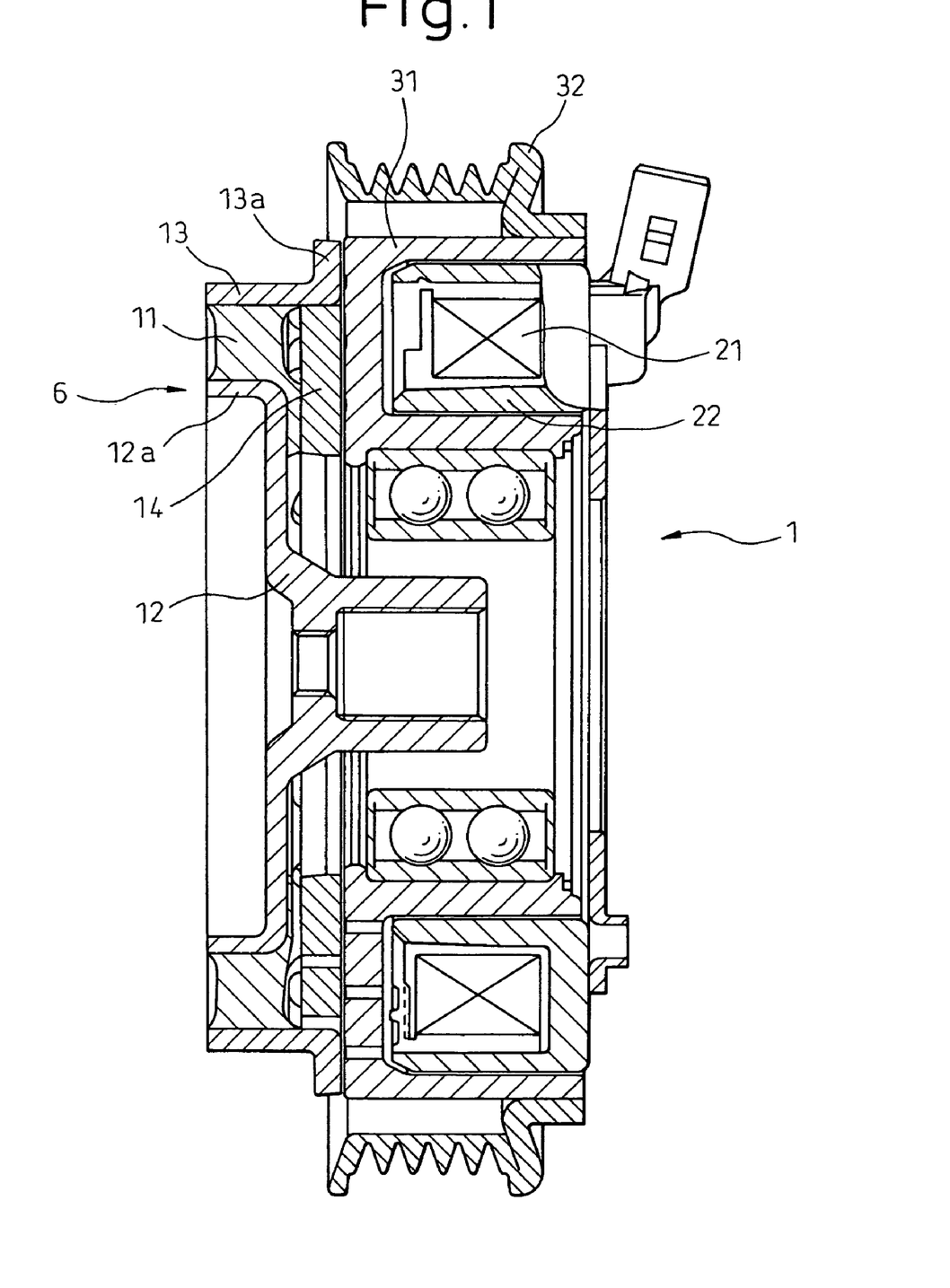
FIG. 1 is a sectional side elevation showing a general configuration of an electromagnetic clutch 1 in a first embodiment of the present invention.
Figure 2:
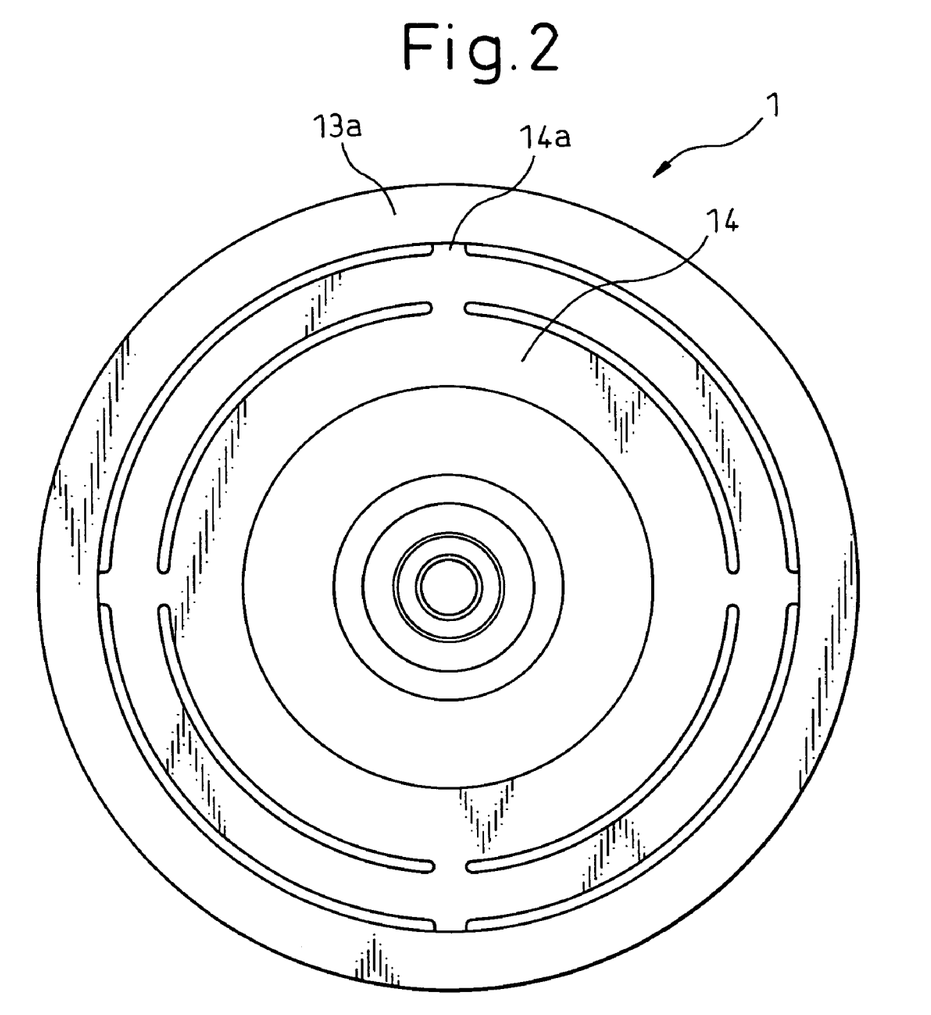
FIG. 2 is a front view of a hub shown in FIG. 1.

FIG. 1 and FIG. 2 illustratively show a first embodiment of an electromagnetic clutch according to the present invention, and FIG. 1 is a sectional side elevation showing a general configuration of an electromagnetic clutch 1 in the first embodiment and FIG. 2 is a front view of a hub 6 in FIG. 1 when viewed from the right side in the figure. Referring to FIG. 1 and FIG. 2, the components in FIG. 1 and FIG. 2 which are the same as or similar to the components of a conventional electromagnetic clutch 100 shown in FIG. 10 are denoted by the same reference symbols.

Referring to FIG. 1 first, the sectional side elevation of the electromagnetic clutch 1, which is arranged between a compressor (not shown) of an air conditioner for a vehicle driven by an engine via belts (not shown) and the belts, is shown. The electromagnetic clutch 1 has a structure substantially the same as that of the conventional example shown in FIG. 10. The electromagnetic clutch 1 comprises an electromagnetic coil 21 accommodated in a stator 22, a rotor 31 rotatively driven by a vehicle engine, which is not shown, an armature 14 attracted to the rotor 31 by the magnetic force of the electromagnetic coil 21, and the hub 6 having an outer plate 13 and an inner hub 12. The transmission of power from the engine to the compressor of the air conditioner for a vehicle via the electromagnetic clutch 1 is basically the same as that in the conventional example described above and, therefore, an explanation will not be given here to avoid duplication.

One end of an elastic member 11 is vulcanizedly adhered to an outermost part 12a of the inner hub 12 and the other is vulcanizedly adhered to the outer plate 13. The outer plate 13 has an L-shaped section and is coupled to the armature 14 by press fitting etc. of the armature 14 and a bridge part 14*a*. As an armature outer ring 13*a* and the armature 14 are separate parts, the thicknesses thereof may be different from each other and the outer diameter part in the magnetic circuit can be reduced in thickness and, therefore, reduction in weight is possible. The electromagnetic clutch has a six-pole structure.

When current is applied to the coil 21, an attracting force appears, the elastic member 11 deflects and the armature 14 is attracted to the side of the rotor 31. The armature 14 and the rotor 31 rotate together by the magnetic force and the power is transmitted to an auxiliary device (for example, a compressor of an air conditioner for a vehicle) connected to the inner hub 12.

When the auxiliary device locks for some reason, the electromagnetic clutch 1 slides and the armature 14 produces heat by the friction between the rotor 31 and the armature 14. In the present embodiment, by integrally forming the outer plate 13 and the armature outer ring 13*a* into one piece having an L-shaped section, the heat produced by sliding on the armature outer ring 13*a* is transmitted to the elastic member 11 efficiently and the elastic member 11 melts quickly, making it possible to quickly shut off the power transmission. It is preferable for the elastic member 11 to come into contact with the armature 14, as shown in FIG. 1, from the standpoint of melting of the elastic member 11.

Figure 3:
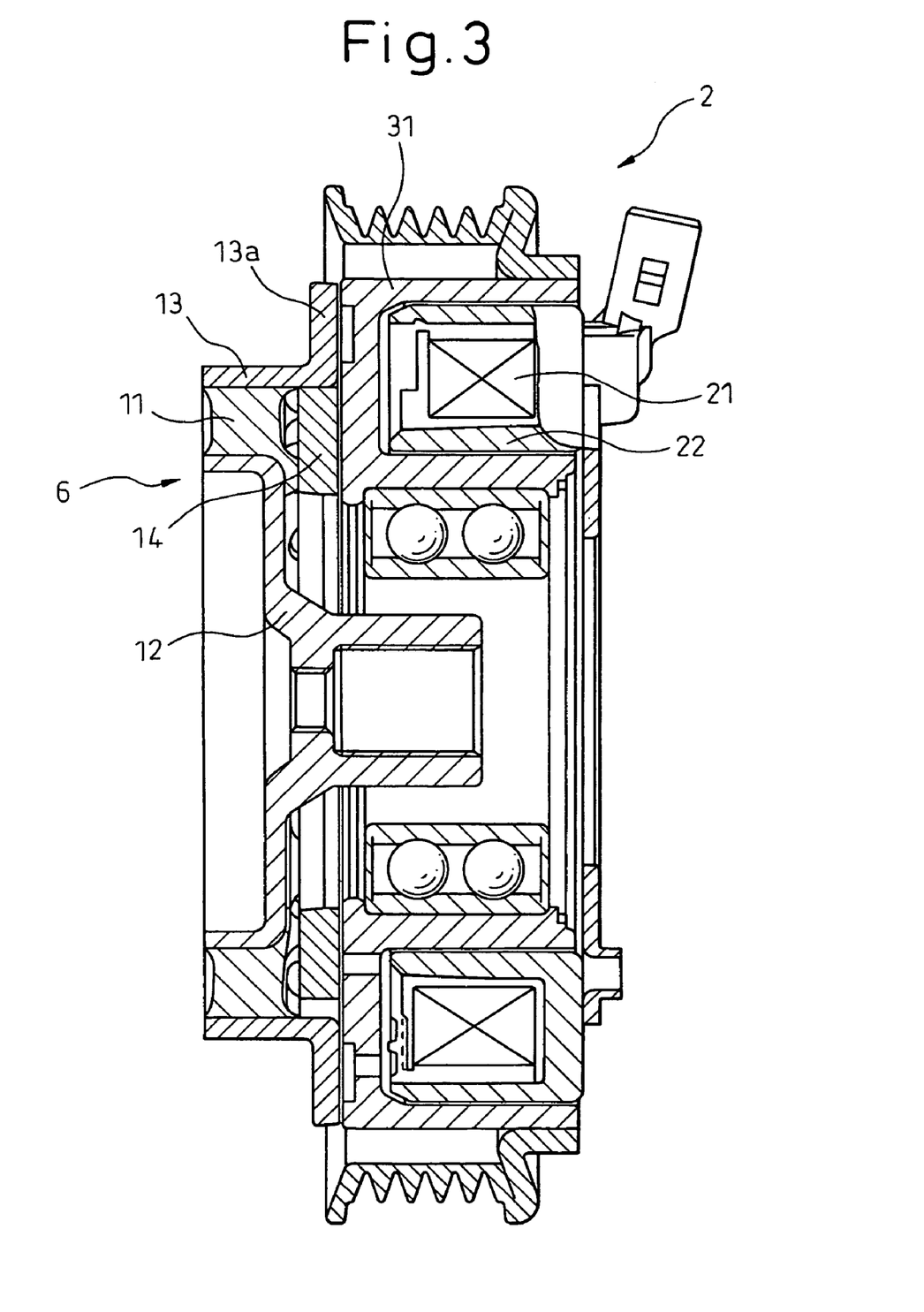
FIG. 3 shows a sectional side elevation of an electromagnetic clutch 2 in a second embodiment of the present invention.

FIG. 3 shows the sectional side elevation of an electromagnetic clutch 2 according to a second embodiment of the present invention. Referring to FIG. 3, the components of the electromagnetic clutch 2 in FIG. 3 which are the same as or similar to the components of the electromagnetic clutch 1 in the first embodiment disclosed in FIG. 1 are denoted by the same reference symbols. According to the second embodiment, the electromagnetic coil 21 has a four-pole structure, in the first embodiment described above, which is the difference from the first embodiment described above. Other structures and operations of the electromagnetic clutch 2 are the same as those of the electromagnetic clutch 1 in the first embodiment.

Figure 4:
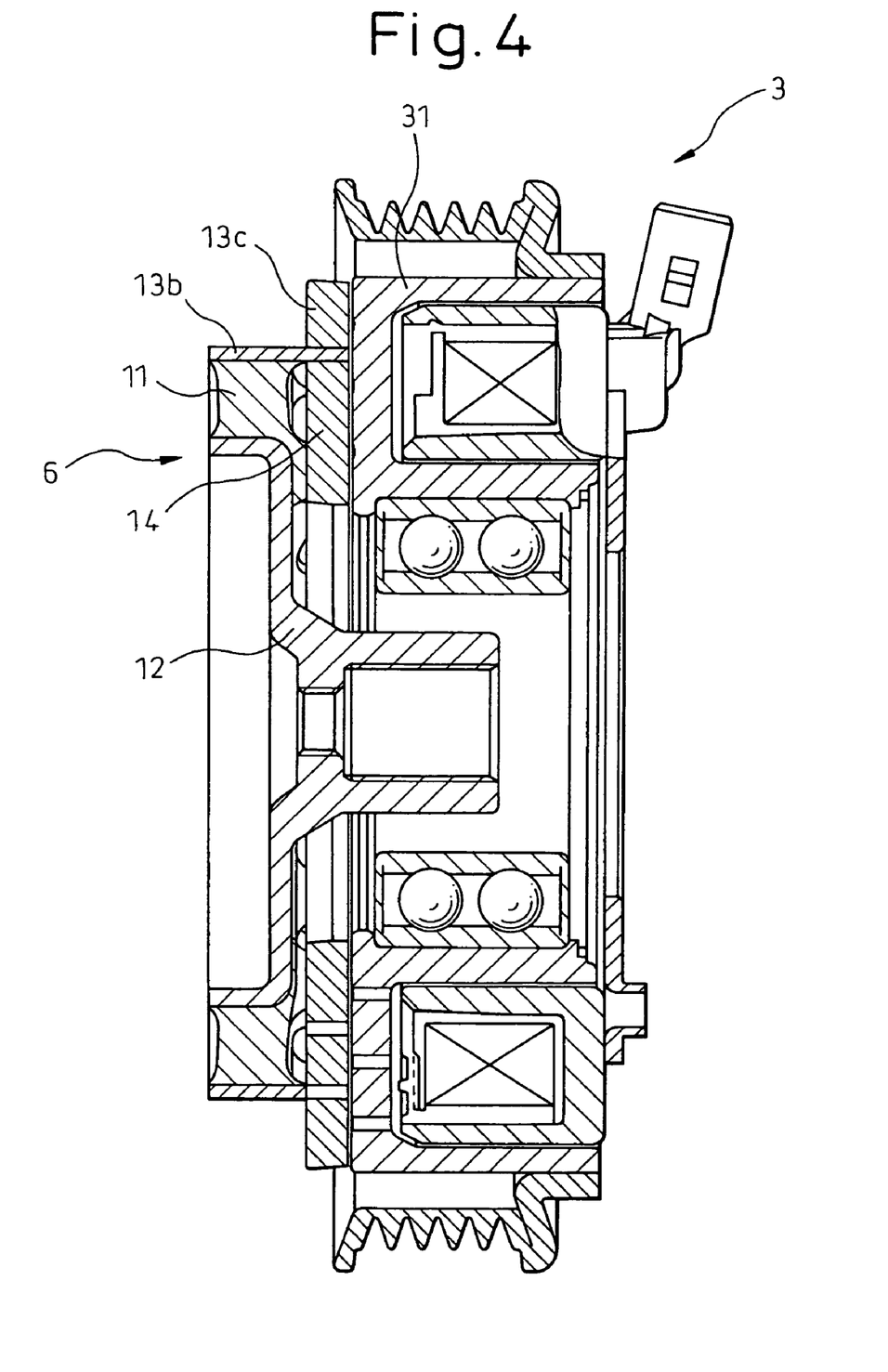
FIG. 4 shows a sectional side elevation of an electromagnetic clutch 3 in a third embodiment of the present invention.
Figure 5:
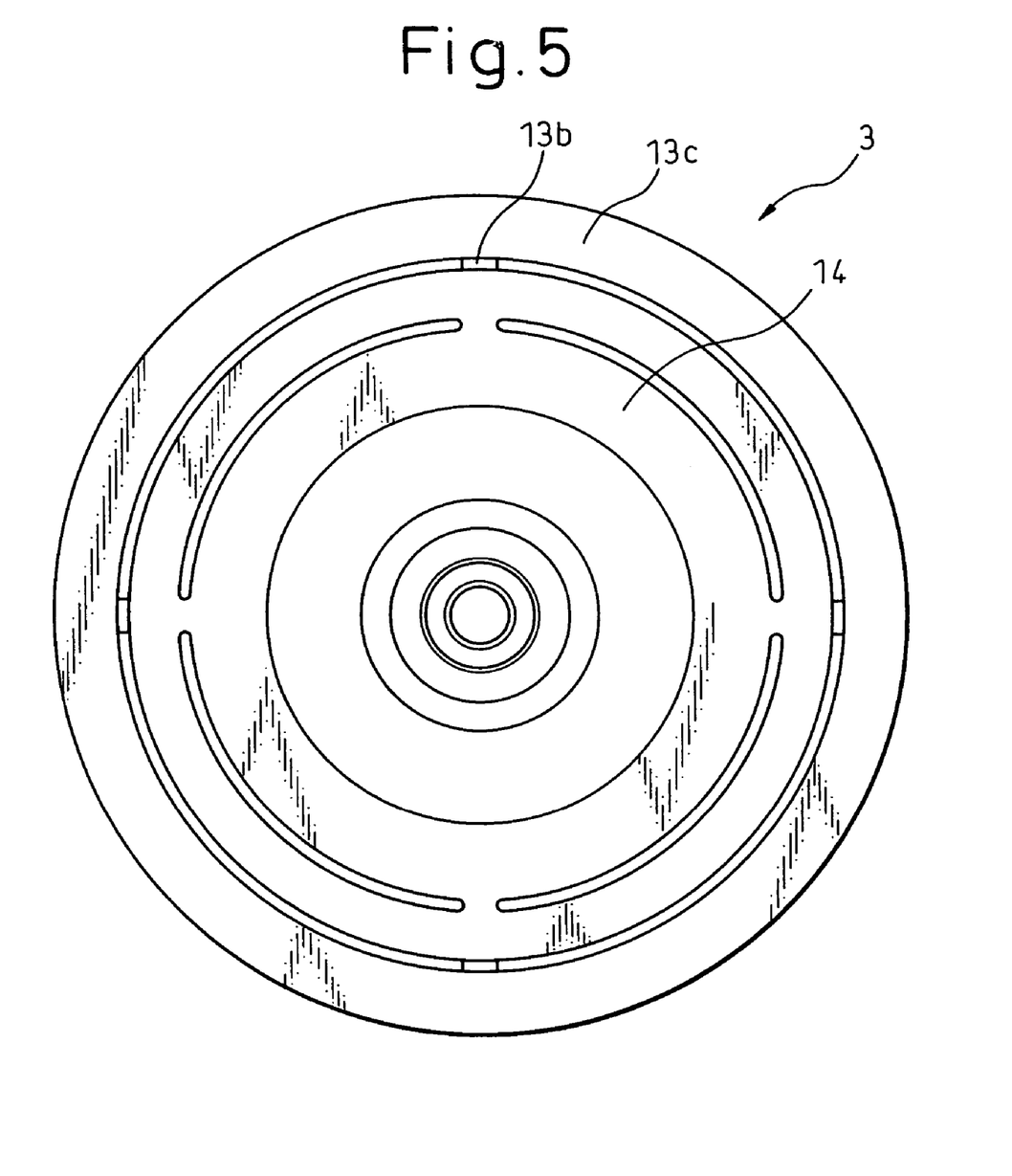
FIG. 5 is a front view of a hub shown in FIG. 4.

FIG. 4 shows the sectional side elevation of an electromagnetic clutch 3 according to a third embodiment of the present invention and FIG. 5 shows the front view of the hub 6 when viewed from the right side in the figure. Referring to FIG. 4 and FIG. 5, the components of the electromagnetic clutch 3 in FIG. 4 and FIG. 5 which are the same as or similar to the components of the electromagnetic clutch 1 in the first embodiment disclosed in FIG. 1 are denoted by the same reference symbols. In the third embodiment according to the first embodiment, an outer plate 13*b* and an armature outer ring 13*c* are formed as separate parts but they are coupled with each other, by press fitting etc., so that heat transmission therebetween is integrally carried out as if they are one piece. The third embodiment differs from the first embodiment described above in that the outer plate 13*b* and the armature outer ring 13*c* are formed as separate parts. Other structures and operations of the electromagnetic clutch 3 are the same as those of the electromagnetic clutch 1 in the first embodiment.

Figure 6:
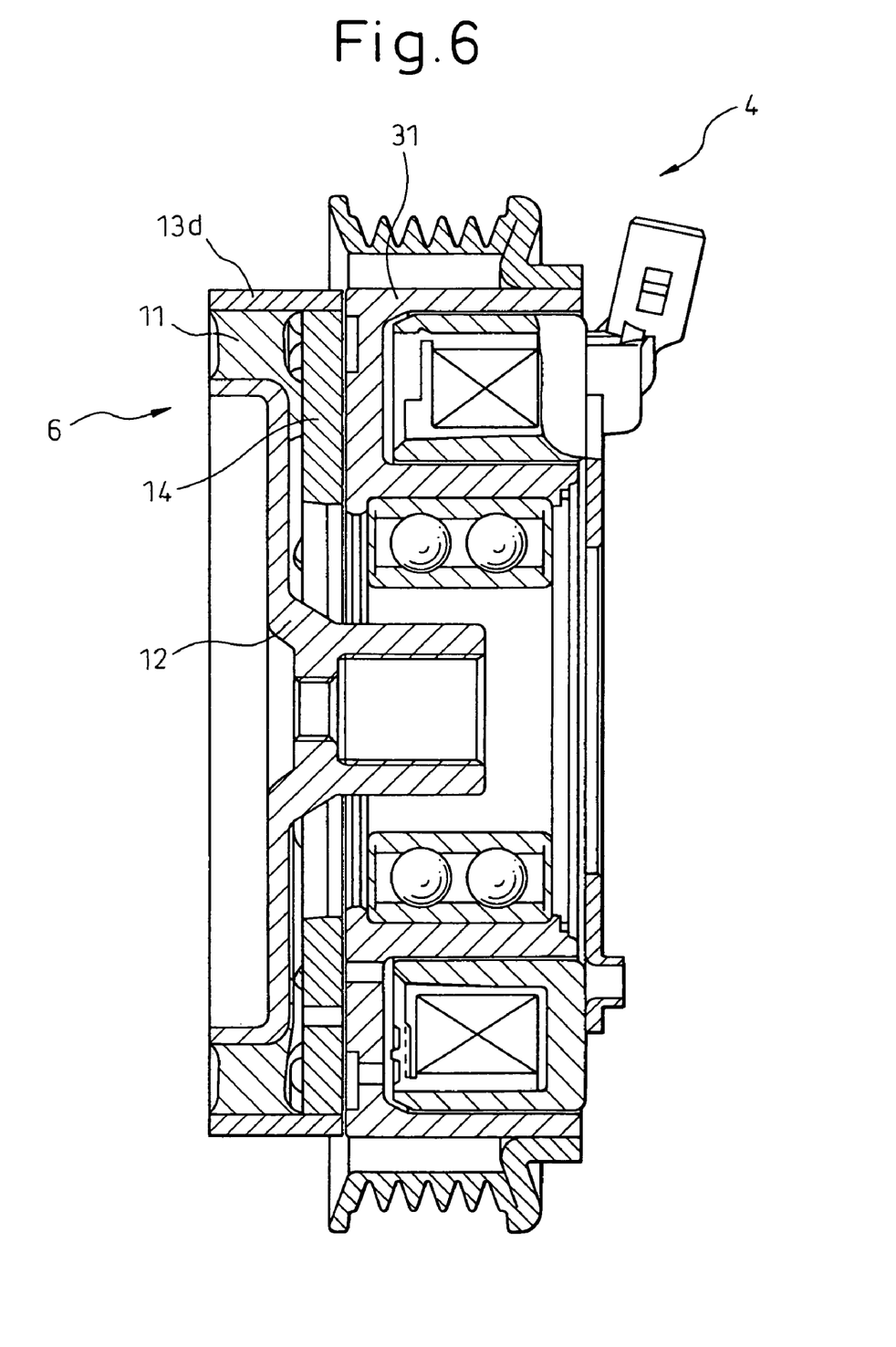
FIG. 6 shows a sectional side elevation of an electromagnetic clutch 4 in a fourth embodiment of the present invention.

FIG. 6 shows the sectional side elevation of an electromagnetic clutch 4 according to a fourth embodiment of the present invention. Referring to FIG. 6, the components of the electromagnetic clutch 4 in FIG. 6 which are the same as or similar to the components of the electromagnetic clutch 1 in the first embodiment disclosed in FIG. 1 are denoted by the same reference symbols. According to the fourth embodiment, an outer plate 13*d* and the armature 14 are formed as separate parts but the armature 14 is coupled only to the inside of the outer plate 13*d* so as to be one piece in a heat-transmissible manner by press fitting, external cylinder drawing (plastic deformation by reduction in diameter), or the like in the first embodiment described above. In this point, the fourth embodiment differs from the first embodiment described above. Other structures and operations of the electromagnetic clutch 4 are the same as those of the electromagnetic clutch 1 in the first embodiment.

Figure 7:
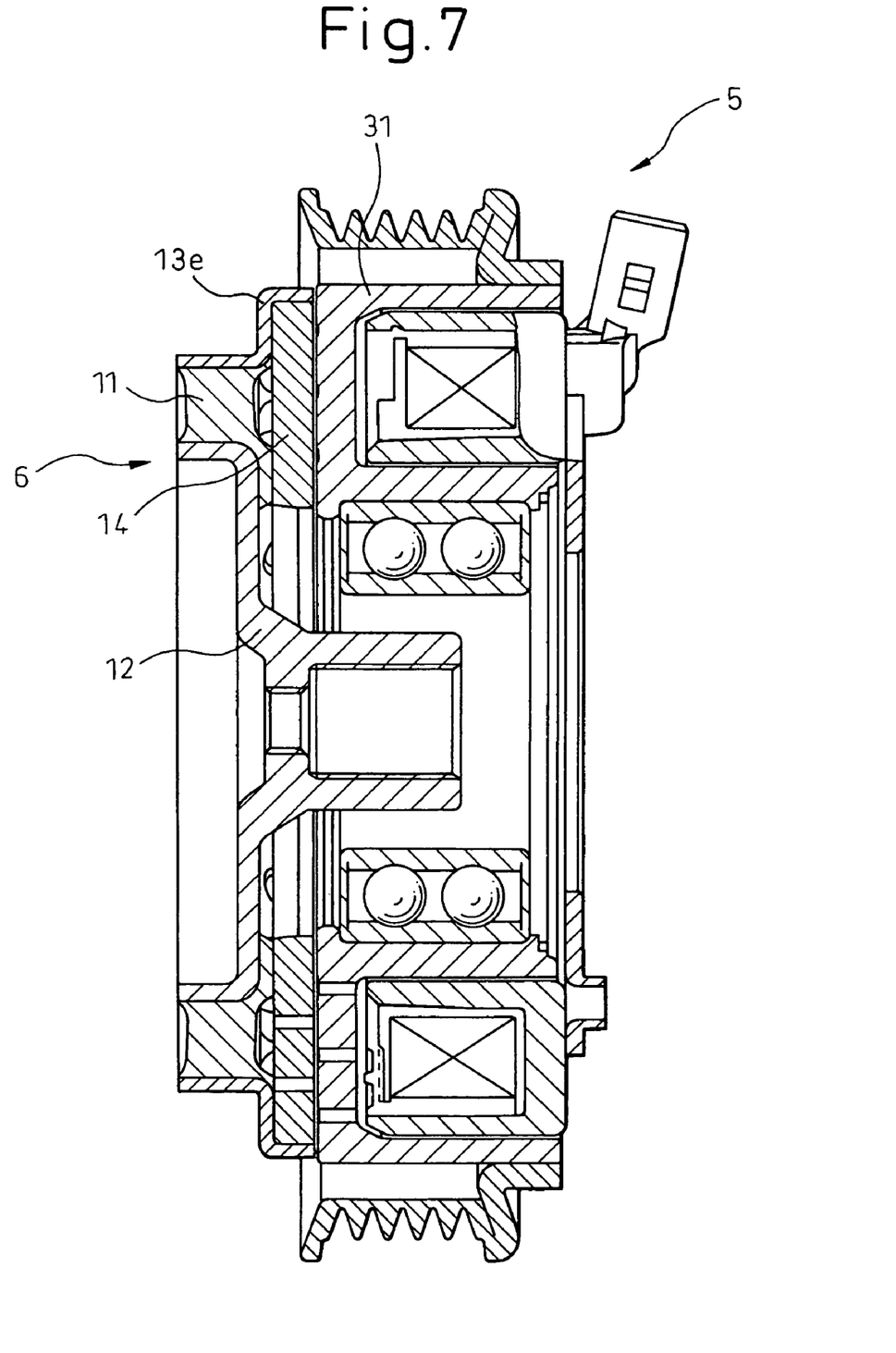
FIG. 7 shows a sectional side elevation of an electromagnetic clutch 5 in a fifth embodiment of the present invention.

FIG. 7 shows the sectional side elevation of an electromagnetic clutch 5 according to a fifth embodiment of the present invention. Referring to FIG. 7, the components of the electromagnetic clutch 5 in FIG. 7 which are the same as or similar to the components of the electromagnetic clutch 1 in the first embodiment disclosed in FIG. 1 are denoted by the same reference symbols. According to the fourth embodiment, the outer plate 13*d* and the armature 14 are formed as separate parts and the armature 14 is coupled only to the inside of the outer plate 13*d*, the section of which is rectilinear as shown in FIG. 6, by press fitting etc., so that heat transmission therebetween is integrally carried out as if they are one piece. In contrast to this, according to the fifth embodiment, an outer plate 13*e* and the armature 14 are also formed as separate parts but the section of the outer plate 13*e* is not rectilinear but meanders so as to have an S-shape as shown in FIG. 7. The configuration, in which the armature 14 is coupled to the inside of the outer plate 13*e*, by press fitting etc., so that heat transmission between the armature 14 and the outer plate 13*e* is integrally carried out as if they are one piece, is the same as that in the fourth embodiment described above. The fifth embodiment differs from the fourth embodiment described above in that the section of the outer plate 13*e* is not rectilinear. Other structures and operations of the electromagnetic clutch 5 are the same as those of the electromagnetic clutch 4 in the fourth embodiment.

Figure 8:
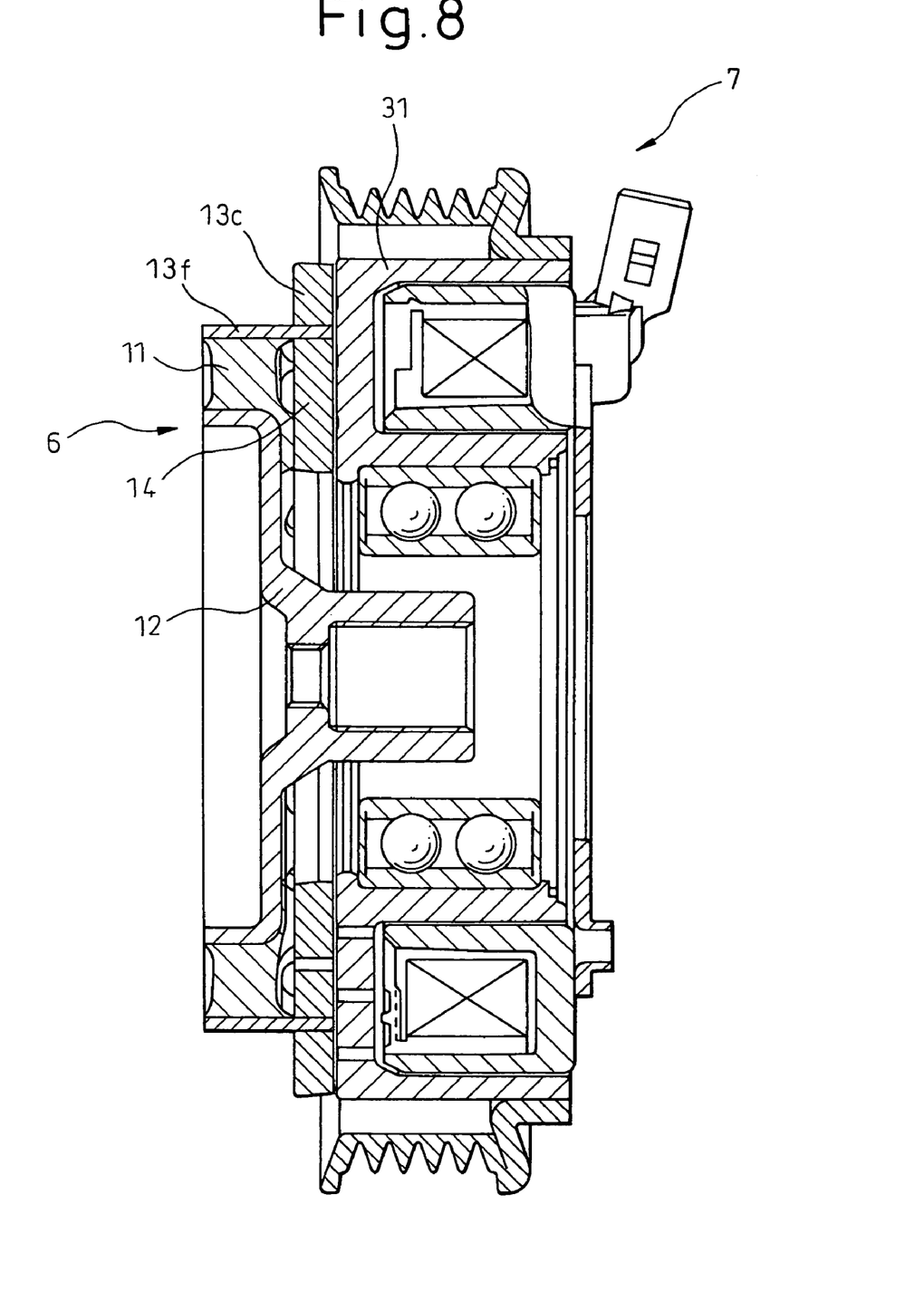
FIG. 8 shows a sectional side elevation of an electromagnetic clutch 7 in a sixth embodiment of the present invention.
Figure 9:
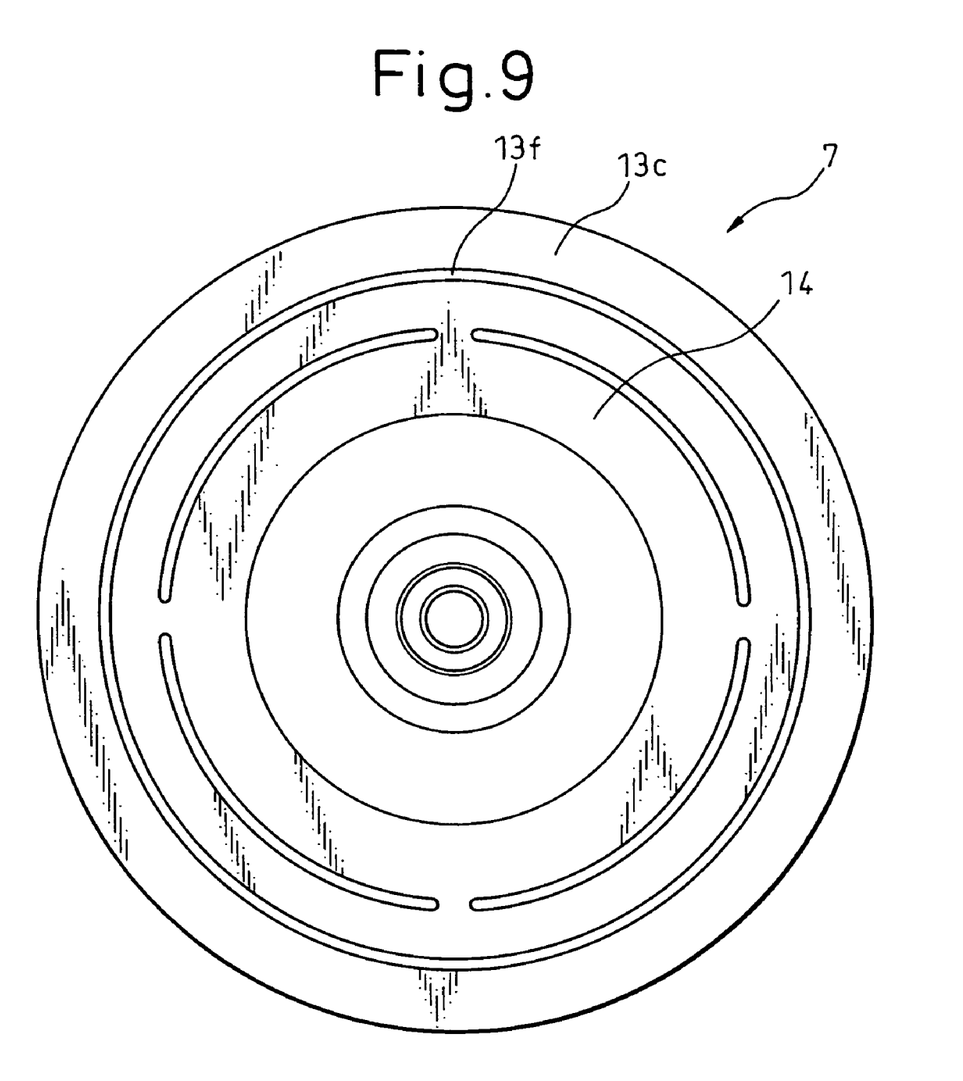
FIG. 9 is a front view of a hub shown in FIG. 8.

FIG. 8 shows the sectional side elevation of an electromagnetic clutch 7 according to a sixth embodiment of the present invention and FIG. 9 shows its front view. Referring to FIG. 8 and FIG. 9, the components of the electromagnetic clutch 7 in FIG. 8 and FIG. 9 which are the same as or similar to the components of the electromagnetic clutch 1 in the first embodiment disclosed in FIG. 1 are denoted by the same reference symbols. The electromagnetic clutch 7 in the sixth embodiment is a modification of the electromagnetic clutch 3 in the third embodiment. In the sixth embodiment, an outer plate 13*f* and the armature outer ring 13*c* are formed as separate parts as in the third embodiment and they are coupled with each other, by press fitting etc., so that heat transmission therebetween is integrally carried out as if they are one piece. In the present embodiment, the outer plate 13*f* is made of non-magnetic metal such as stainless and extends along the entire circumference of the electromagnetic clutch 7 as seen from the front view in FIG. 9. Further, the outer plate 13*f* is in contact with the rotor 31. On the other hand, in the third embodiment, the outer plate 13*b* is inserted into the armature 14 partially at four points as shown in FIG. 5. The sixth embodiment differs from the third embodiment in that the outer plate 13*f* extends along the entire circumference, which is clear from the comparison between FIG. 9 and FIG. 5. In the sixth embodiment, it becomes easier to transmit heat from the outer plate 13*f* to the elastic member 11. Other structures and operations of the electromagnetic clutch 7 are the same as those of the electromagnetic clutch 3 in the third embodiment.

Next, the effect and function of the embodiments described above are explained below.

The following effect can be expected from the electromagnetic clutch 1 in the first embodiment of the present invention.

The electromagnetic clutch 1 according to the prior art described in Patent document 1 has a great damping effect and excellent performance of absorbing torque variations. Therefore, by integrally forming the outer plate and the armature into one piece with no gap in between in this structure, the transmission of the heat produced at the frictional surface to the elastic member becomes more efficiently. As a result, it becomes easy to melt the elastic member to stop power transmission.

In addition to the effect of the first embodiment described above, the following effect can be expected from the electromagnetic clutch in the second embodiment of the present invention.

In the first embodiment, the electromagnetic coil of the electromagnetic clutch has six poles but the present invention can be applied to the case of the four-pole electromagnetic coil.

In addition to the effect of the first embodiment described above, the following effect can be expected from the electromagnetic clutch in the third embodiment of the present invention.

As the outer plate 13b and the armature outer ring 13c are formed as separate parts, there is the possibility that the manufacture of the outer plate 13b and the armature outer ring 13c becomes easier and they are coupled with each other, by press fitting etc., so that heat transmission therebetween is integrally carried out as if they are one piece and, therefore, the fact that it is easy to melt the elastic member and stop power transmission remains.

In addition to the effect of the first embodiment described above, the following effect can be expected from the electromagnetic clutch in the fourth embodiment of the present invention.

Another embodiment different from the third embodiment is disclosed, in which the structure has no armature outer ring and as for heat transmission, and it is easy to transmit heat from the armature to the elastic member.

In addition to the effect of the first embodiment described above, the following effect can be expected from the electromagnetic clutch in the fifth embodiment of the present invention.

It is possible to increase the contact area between the outer plate and the armature and, thereby, heat is readily transmitted to the elastic member.

In addition to the effect of the first embodiment described above, the following effect can be expected from the electromagnetic clutch in the sixth embodiment of the present invention.

Compared to the third embodiment described above, heat is more readily transmitted from the armature to the elastic member via the outer plate and, therefore, it is possible to melt the elastic member more quickly.

As the outer plate is a non-magnetic material, the magnetic performance is improved compared to the case where there exists the bridge and, therefore, the transmission torque performance is improved.

In the above explanation, the case is described where the electromagnetic clutch is used for intermittently operating the compressor of an air conditioner for a vehicle, but the present invention is not limited to this and may be used for other than the compressor of an air conditioner for a vehicle.

In the embodiments described above or the embodiments shown in the accompanying drawings, the electromagnetic coil has six or four poles, but another number of poles is possible.

While the invention has been described by reference to specific embodiments chosen for the purposes of illustration, it should be apparent that numerous modifications could be made thereto by those skilled in the art without departing from the basic concept and scope of the invention.

The invention claimed is:

1. An electromagnetic clutch comprising:
a rotor connected to a drive source, the rotor being rotatable around an axis;
an inner hub connected to a device that is driven;
an outer plate provided on an outside of the inner hub so as to enclose it;
an armature coupled to the outer plate and opposing the rotor;
an elastic member provided between the inner hub and the outer plate and adhered thereto; and
an electromagnetic coil for, when magnetized by being applied with a current, attracting the armature together with the outer plate to make the outer plate come directly into contact with the rotor and to make the armature come directly into contact with the rotor and, when demagnetized by terminating application of current, separating the outer plate and the armature from the rotor; wherein
the outer plate is longer than the armature in an axial direction of the axis; and
the elastic member is cylindrical and adhered to at least a portion of the outer plate extending further in the axial direction than the armature.

2. The electromagnetic clutch as set forth in claim 1, wherein the elastic member has an adhesion surface adhered to the outer plate and the adhesion surface is parallel to an electromagnetic clutch shaft line.

3. The electromagnetic clutch as set forth in claim 2, wherein the armature comprises two parts divided by a magnetic shut-off section and one part thereof is integrally formed with the elastic member having an adhesion surface to the outer plate, and the adhesion surface is parallel to the electromagnetic clutch shaft line and one part is connected to the other part at a bridge part.

4. The electromagnetic clutch as set forth in claim 3, wherein the method, by which the armature having the two parts divided by the magnetic shut-off section and the outer plate are coupled with each other, is press fitting or external cylinder drawing.

5. The electromagnetic clutch as set forth in claim 2, wherein the armature and the outer plate are disposed to have a gap there between.

6. The electromagnetic clutch as set forth in claim 1, wherein the elastic member is substantially cylindrical, an inner wall of the elastic member is adhered to an outer part of the inner hub, and an outer wall of the elastic member is adhered to an inner wall of the outer plate.

7. The electromagnetic clutch as set forth in claim 1, wherein the elastic member is in contact with the armature.

8. The electromagnetic clutch as set forth in claim 1, wherein the outer plate has an L-shaped sectional area.

9. The electromagnetic clutch as set forth in claim 1, wherein the outer plate and armature are formed so that an area of contact for heat transmission between the outer plate and the armature does not extend along the entire circumference of the armature.

10. The electromagnetic clutch a set forth in claim 1, wherein the electromagnetic clutch is used for connecting and disconnecting a refrigerant compressor of an air conditioner and a vehicle engine.

11. The electromagnetic clutch as set forth in claim 1, wherein the outer plate has a plurality of contact surfaces which come in contact with the rotor, the plurality of surfaces are isolated in a circumferential direction.

12. The electromagnetic clutch as set forth in claim 1, wherein the armature and the outer plate are coupled by press fitting or external cylinder drawing.

13. An electromagnetic clutch comprising:
a rotor connected to a drive source, the rotor being rotatable around an axis;
an inner hub connected to a device that is driven;
an outer plate provided on an outside of the inner hub so as to enclose it;
an armature coupled to the outer plate and opposing the rotor, the armature being entirely disposed within a cylinder defined by the outer plate;
an elastic member provided between the inner hub and the outer plate and adhered thereto; and
an electromagnetic coil for, when magnetized by being applied with a current, attracting the armature together with the outer plate to make the armature and the outer plate directly come into contact with the rotor and, when demagnetized by terminating application of current, separating the outer plate and the armature from the rotor; wherein
the outer plate is longer than the armature in an axial direction of the axis; and
the elastic member is cylindrical and adhered to at least a portion of the outer plate extending further in the axial direction than the armature.

14. An electromagnetic clutch comprising:
a rotor connected to a drive source, the rotor being rotatable around an axis;
an inner hub connected to a device that is driven;
an outer plate provided on an outside of the inner hub so as to enclose it;
an armature coupled to the outer plate and opposing the rotor, the armature being fully encompassed by the outer plate;
an elastic member provided between the inner hub and the outer plate and adhered thereto; and
an electromagnetic coil for, when magnetized by being applied with a current, attracting the armature together with the outer plate to make the armature and the outer plate directly come into contact with the rotor and, when demagnetized by terminating application of current, separating the outer plate and the armature from the rotor; wherein
the outer plate is longer than the armature in an axial direction of the axis; and
the elastic member is cylindrical and adhered to at least a portion of the outer plate extending further in the axial direction than the armature.

* * * * *